(12) United States Patent
Bassett et al.

(10) Patent No.: US 6,970,363 B2
(45) Date of Patent: Nov. 29, 2005

(54) EXPANSION CARD SUPPORT MECHANISM

(75) Inventors: Jonathan D. Bassett, Fort Collins, CO (US); Kristina L. Mann, Fort Collins, CO (US); James R. Bullington, Athens, AL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/723,024

(22) Filed: Nov. 26, 2003

(65) Prior Publication Data

US 2005/0111203 A1 May 26, 2005

(51) Int. Cl.7 ............................. H05K 7/12; H05K 7/14
(52) U.S. Cl. ...................... 361/801; 361/796; 361/755; 361/759; 211/41.17
(58) Field of Search ................................ 361/728–732, 361/740, 747, 752, 754, 755, 759, 796–801; 174/50; 211/41.17

(56) References Cited

U.S. PATENT DOCUMENTS

| 5,317,483 | A |   | 5/1994  | Swindler |
| 5,623,396 | A | * | 4/1997  | Blackwell .................. 361/801 |
| 5,657,204 | A | * | 8/1997  | Hunt ........................... 361/752 |
| 6,160,712 | A |   | 12/2000 | Itai et al. |
| 6,185,104 | B1 | * | 2/2001 | Obermaier .................. 361/759 |
| 6,220,887 | B1 | * | 4/2001 | Downs ....................... 439/377 |
| 6,256,191 | B1 | * | 7/2001 | Curlee ........................ 361/683 |
| 6,396,685 | B1 | * | 5/2002 | Chien ......................... 361/683 |
| 6,618,264 | B2 | * | 9/2003 | Megason et al. ........... 361/759 |

FOREIGN PATENT DOCUMENTS

WO          WO0051406 C2          8/2000

* cited by examiner

Primary Examiner—Kamand Cuneo
Assistant Examiner—Dameon E. Levi

(57) ABSTRACT

The disclosed embodiments relate to an expansion card support mechanism. In certain embodiments, a tool-free, chassis mountable arm comprising a support end and a card-configurable mount to orient the support end over an expansion card within a chassis, wherein the chassis mountable arm is adapted to bias the expansion card. In other embodiments, a system has a card support mechanism configurable for at least one electronics card. The card support mechanism has a chassis with at least one tool-free mounting mechanism, and an arm rotatably coupled to the chassis, wherein the arm comprises a card retention end springably engageable against a peripheral portion of the at least one electronics card.

29 Claims, 6 Drawing Sheets

EXPANSION CARD SUPPORT MECHANISM

BACKGROUND OF THE RELATED ART

Electronic systems and devices, such as desktop computers and servers, often provide expansion capabilities such as expansion slots for expansion cards. In certain applications, these expansion cards are not physically supported at peripheral portions, thereby rendering the expansion cards vulnerable to undesirable vibrations and movement during shipping and other events. As a result, these vibrations and movement can damage the expansion card and the surrounding electronics and render the system non-functional.

Several techniques may be used to prevent such damaging vibrations and movement. For example, a full-length expansion card may have an end retainer securable to the chassis with a screw. However, the end retainer does not provide intermediate support for the expansion card, thereby leaving the expansion card vulnerable to substantial vibrations and movement. Another example is a retainer mounted to a bar spanning the chassis over the expansion card. However, the bar renders the expansion card inaccessible without first detaching the bar. A further example is a clam-shell chassis having a retainer mounted to a hinged access panel. Unfortunately, these techniques are not readily adjustable or modifiable to the particular expansion card. For example, these techniques are generally not configurable to the existence or non-existence of expansion cards and, thus, they are added at cost to every system regardless of the need for expansion card support. These techniques also can complicate access to the expansion cards and interfere with cabling and other components.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
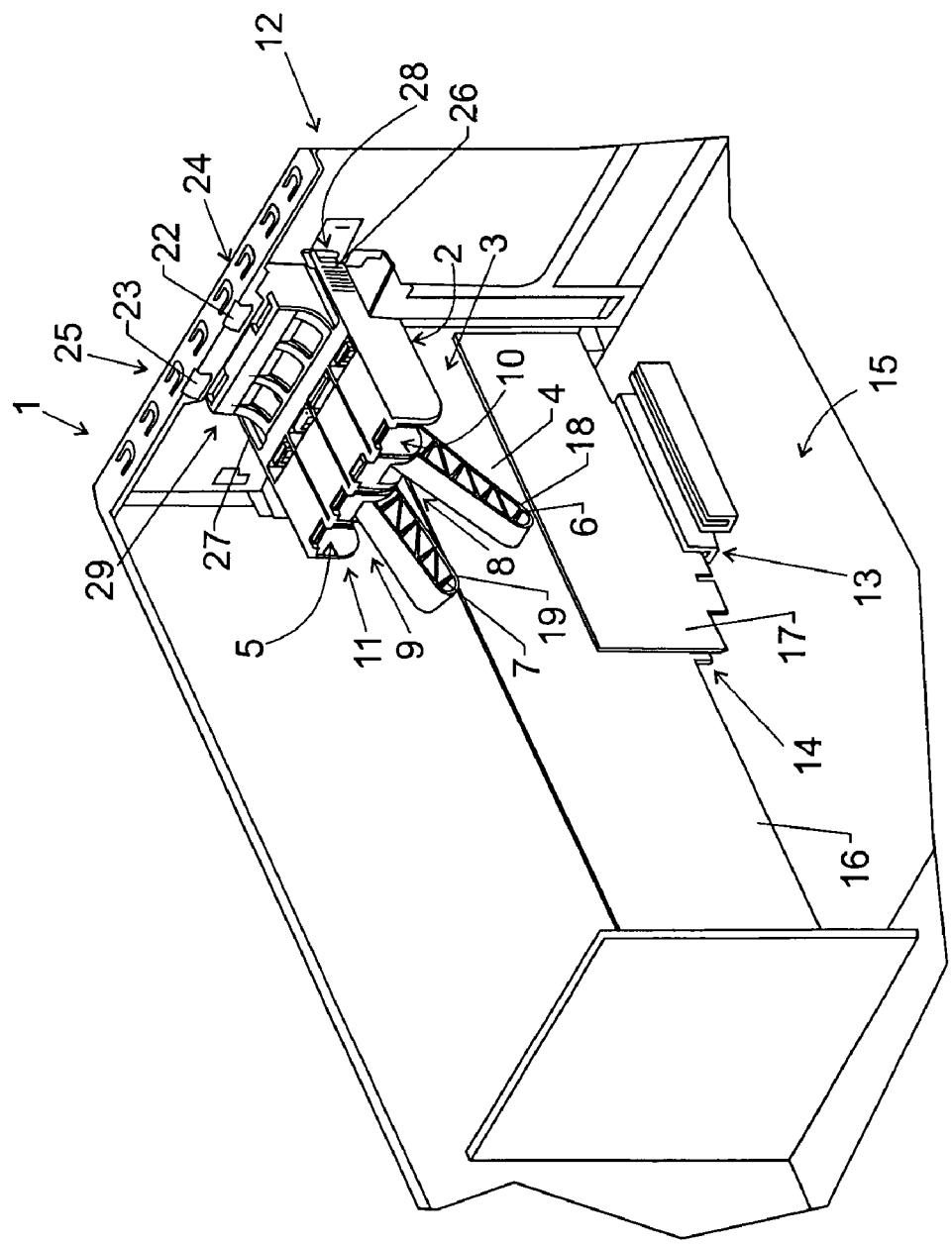
FIG. 1 is a perspective view of a computer chassis comprising an adjustable card support positioned over a card slot according to certain embodiments of the present invention.
Figure 2:
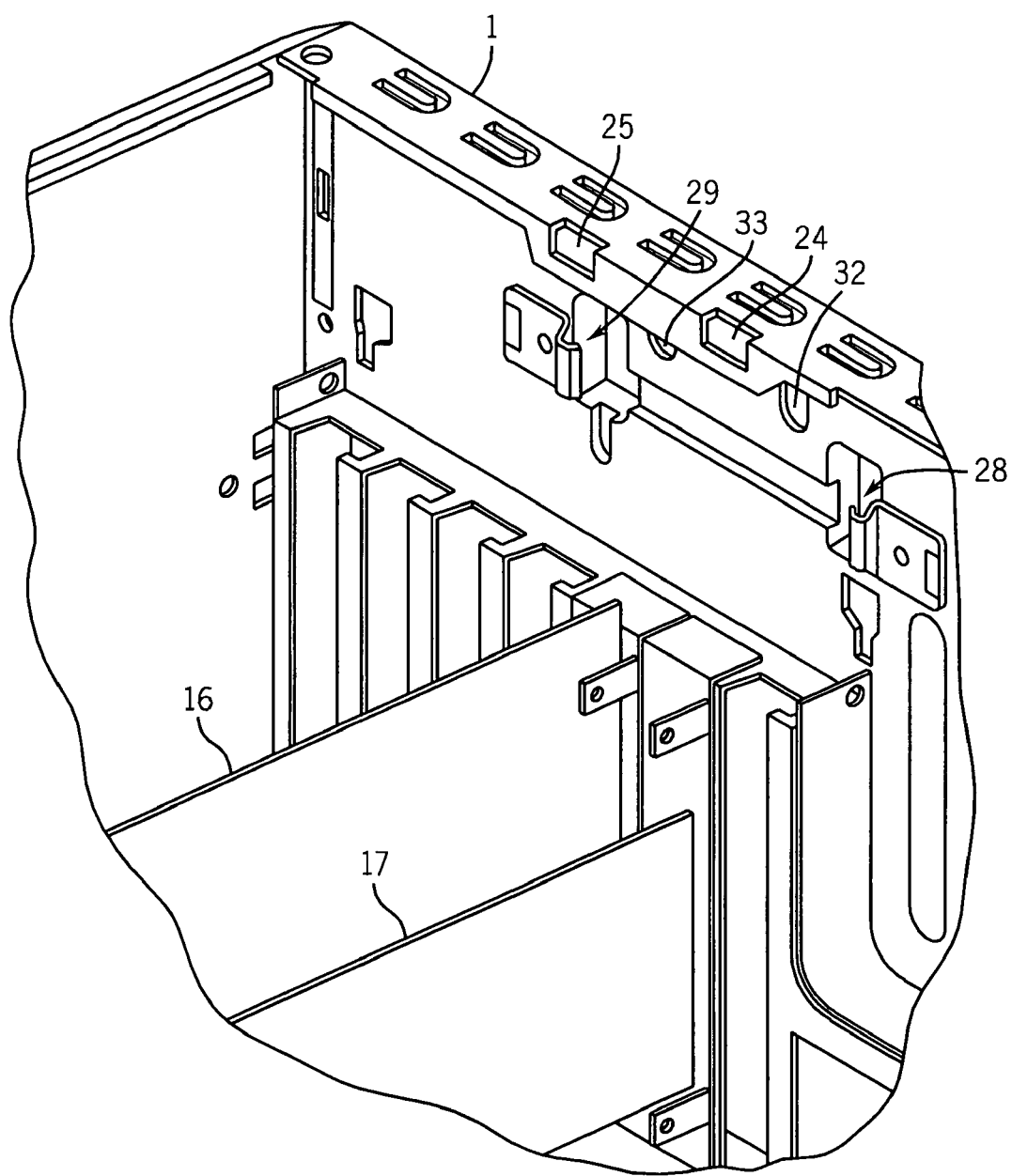
FIG. 2 is a perspective view of the computer chassis illustrating mounting features for the adjustable card support in accordance with certain embodiments of the present invention.

FIG. 1 is a perspective view illustrating a computer chassis 1 having an adjustable card support 2 in accordance with certain embodiments of the present invention. As discussed in further detail below, the adjustable card support 2 is adapted to retain an expansion card in connection with a desired card slot, while also physically supporting the expansion card at a peripheral portion or outer region (e.g., freely movable side or card edge). In this manner, the adjustable card support 2 inhibits undesired vibrations and movement of the expansion card during shipping and other events. Moreover the adjustable card support 2 is configurable to accommodate one or more expansion cards, which may have a variety of different features, dimensions, weights, and so forth. The adjustable card support 2 further provides tool-free mounting mechanisms to simplify mounting and dismounting of the support 2 and its various components. In certain embodiments, the adjustable card support 2 is cantilevered to the chassis 1, such that the adjustable card support extends over the desired one or more expansion cards.

As illustrated in FIG. 1, the adjustable card support 2 comprises a chassis mountable base 3 and an array of one or more resilient arms or spring-loaded fingers 4. As discussed below, the chassis mountable base 3 may be mounted to the computer chassis 1 by any suitable tool-based or tool-free mechanism, such as a latch, a hook and slot, a snap-fit structure, a spring biased catch and receptacle, a friction fit, a compressive fit, and other suitable techniques. Similarly, the spring-loaded fingers 4 may be mounted to the chassis mountable base 3 by any suitable tool-based or tool-free mechanism, such as the foregoing techniques. Moreover, the illustrated spring-loaded fingers 4 are selectively mountable, removable, and exchangeable with a variety of different resilient arms or spring-loaded fingers 4, such that the adjustable card support 2 can accommodate various types, sizes, and configurations of expansion cards. For example, various embodiments of the finger 4 may comprise a spring of a desired stiffness, a material of a desired flexibility, a length suitable for dimensions of a particular expansion card, and so forth.

In the illustrated embodiment, the one or more resilient arms or spring-loaded fingers 4 are rotatably mounted to the chassis mountable base 3 at an array of one or more receptacles 5. Although various embodiments may have different numbers and configurations of the spring-loaded fingers 4 and receptacles 5, the illustrated embodiment comprises four of the receptacles 5 to accommodate up to four of the spring-loaded fingers 4, while only two of the spring-loaded fingers 4 are employed in the illustrated computer chassis 1. More specifically, the illustrated adjustable card support 2 comprises spring-loaded fingers 6 and 7 mounted in receptacles 8 and 9 of the receptacle array 5. If desired, additional spring-loaded fingers 4 may be disposed in vacant receptacles 10 and 11 of the receptacle array 5. Accordingly, the array of receptacles 5 provides the flexibility to mount these various resilient arms or spring-loaded fingers 4 over resident expansion cards, while removing the fingers 4 for vacant expansion card slots.

As further illustrated in FIG. 1, the spring-loaded fingers 4 of the adjustable card support 2 are adapted to bias expansion cards into a mounted position, and are further adapted for substantially inhibiting lateral movement of intermediate peripheral portions of the expansion cards (i.e., free outer regions). Accordingly, the illustrated adjustable card support 2 is cantilevered to a rear portion 12 of the computer chassis 1, such that the spring-loaded fingers 6 and 7 are positioned above card slots 13 and 14 disposed on a motherboard or circuit board 15. Although the adjustable card support 2 may accommodate a variety of sizes and types of expansion cards, the illustrated chassis 1 comprises a full-sized expansion card 16 disposed in card slot 13 and a low-profile or reduced size expansion card 17 disposed in card slot 14. Upon mounting the adjustable card support 2, the spring-loaded fingers 6 and 7 engage the full-sized and low-profile expansion cards 16 and 17 at intermediate peripheral portions or intermediate card edges opposite from the card slots 13 and 14 (i.e., at free outer regions). In operation, the spring-loaded fingers 6 and 7 of the finger array 5 create a retention or biasing force directed toward the card slots 13 and 14, such that the spring-loaded fingers 6 and 7 bias the expansion cards 16 and 17 securely within the card slots 13 and 14.

Figure 4:
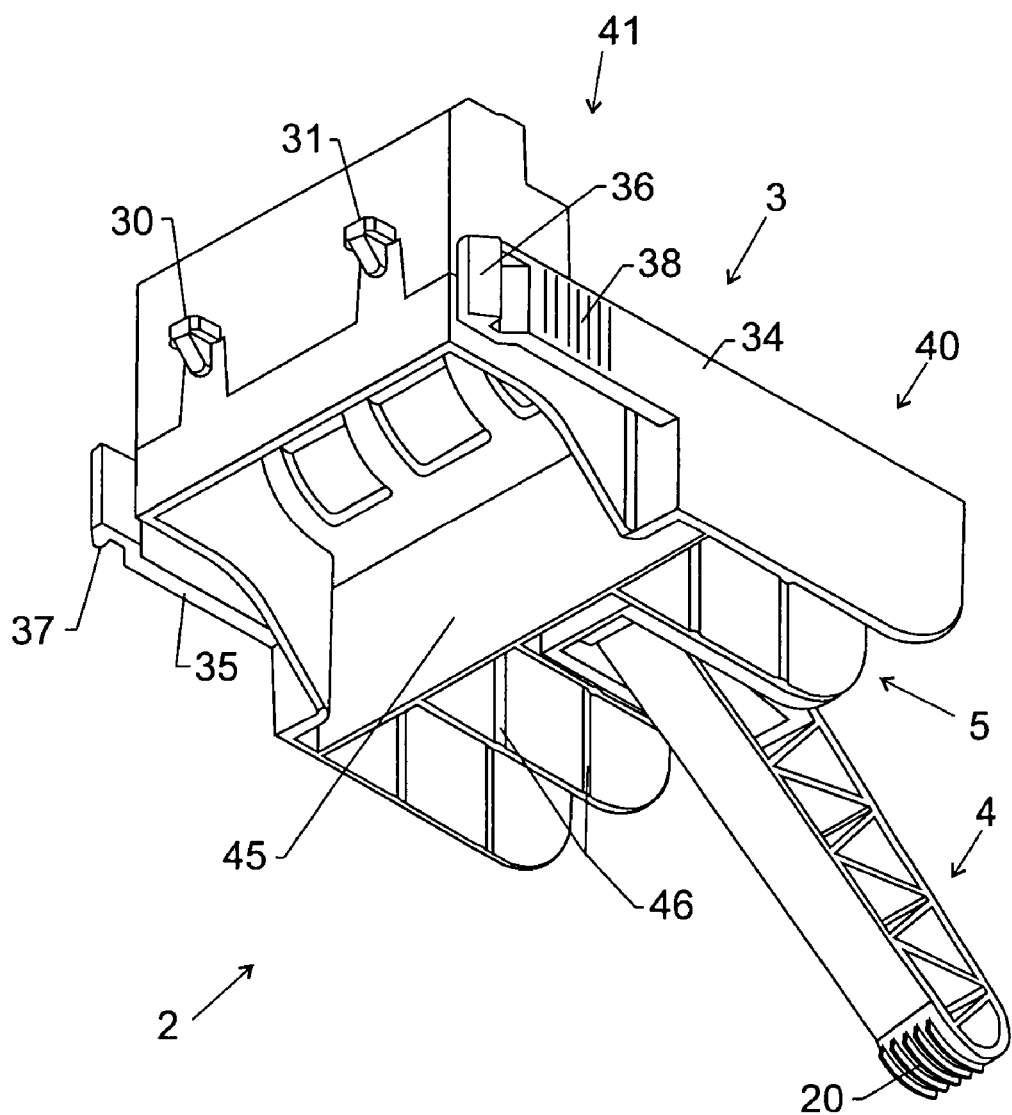
FIG. 4 is a rear perspective view of the adjustable card support illustrating tool-free mounting mechanisms for a chassis mountable base in accordance with certain embodiments of the present invention.

Additionally, the spring-loaded fingers 6 and 7 comprise lateral retention mechanisms or contacting portions 18 and 19, which are adapted to inhibit lateral movement of the peripheral portions of the expansion cards 16 and 17 opposite the card slots 13 and 14. In certain embodiments, the contacting portions 18 and 19 comprise a substantially frictional material, such as a rubberized pad or a sticky material. Moreover, some embodiments of the contacting portions 18 and 19 may comprise a plurality of grooves, ribs, fins, or other multi-leveled surfaces, which laterally secure the peripheral portions of the expansion cards 16 and 17. As illustrated in FIG. 4, the contacting portions 18 and 19 comprise plastic ribs 20, which are integral to the spring loaded finger 4.

In addition to the foregoing retention features, the adjustable card support 2 illustrated in FIG. 1 is configurable to various card sizes, e.g., dimensions and weights. Specifically, the adjustable card support 2 is automatically adjustable to different card heights by way of the rotatability and spring-loaded characteristics of the spring-loaded finger 4. For example, if a relatively tall expansion card is mounted below the adjustable card support 2, then the spring-loaded finger 4 rotates to a relatively higher position to accommodate the tall expansion card. Similarly, if a relatively short expansion card is mounted below the adjustable card support 2, then the spring-loaded finger 4 rotates to a relatively lower position to accommodate the short expansion card. However, in either application, the spring-loaded finger 4 provides a retention force against the expansion card to retain the expansion card securely within its respective card slot. In addition, a variety of different spring loaded fingers 4 may be selected to accommodate different card dimensions, weights, and so forth. For example, a longer or shorter finger 4 may be selected based on the height of the expansion card. Moreover, a variety of different spring loads, types, or configurations may be selected depending on the desired retention force for a particular expansion card. For example, a stiffer spring force may be selected for a finger 4 being used for a heavier expansion card.

Referring generally to FIGS. 1 through 4, the adjustable card support 2 also provides for the attachment and detachment with the computer chassis 1 without the use of tools, i.e., tool-free, in accordance with certain embodiments of the present invention. For example, embodiments may have tool-free mounting mechanisms, such as latches, snaps, hooks, compression fits, and/or friction fits, without tool-based mounting mechanisms, such as screws and bolts. Although the adjustable card support 2 may comprise a variety of tool-free mounting mechanisms, the illustrated adjustable card support 2 comprises housing hooks 22 and 23 coupled with hook couplings 24 and 25 on the rear portion 12 of the computer chassis 1. Additionally, the illustrated adjustable card support 2 comprises squeeze snaps 26 and 27 coupled to hook members and/or receptacles 28 and 29 on the rear portion 12 of the computer chassis 1. The adjustable card support 2 also has protruding tabs or lips 30 and 31, which are insertable into mating receptacles 32 and 33 on the rear portion 12 of the computer chassis 1.

For attachment of the adjustable card support 2 to the computer chassis 1, the housing hooks 22 and 23 are interlocked with the hook couplings 24 and 25. The adjustable card support 2 is then rotated about the hook couplings 24 and 25 to position the squeeze snaps 26 and 27 adjacent the hook members or receptacles 28 and 29 on the rear portion 12 of the computer chassis 1. Upon further rotation, the squeeze snaps 26 and 27 are automatically deflected by their contact with the hook members or receptacles 28 and 29, and the squeeze snap lips or latches 36 and 37 automatically and securely engage with the hook members or receptacles 28 and 29 on the rear portion 12 of the computer chassis 1. Additionally, as the latches 36 and 37 engage and interlock with the hook members or receptacles 28 and 29, the protruding tabs or lips 30 and 31 engage the mating receptacles 32 and 33.

For removal of the adjustable card support 2 from the computer chassis 1, the squeeze snaps 26 and 27 are depressed at grip members 38 to facilitate decoupling of the squeeze snap lips or latches 36 and 37 from the hook members or receptacles 28 and 29. The adjustable card support 2 may then be rotated away from the rear portion 12 of the computer chassis 1 about the interlocked housing hooks 22 and 23 and hook couplings 24 and 25. During this rotation, the protruding tabs or lips 30 and 31 disengage the mating receptacles 32 and 33. Finally, the housing hooks 22 and 23 can be disengaged from the hook couplings 24 and 25. Accordingly, the tool-free mounting mechanisms of the adjustable card support 2 facilitate quick and easy attachment and detachment with the computer chassis 1 without the use of tools or additional separate fasteners (e.g., screws, bolts, etc.). Again, as discussed above, the adjustable card support 2 may incorporate other suitable tool-free mounting mechanisms.

The spring-loaded fingers 4 also benefit from tool-free mounting mechanisms. As discussed above, the adjustable card support 2 comprises one or more spring-loaded fingers 4 mounted in receptacles 5 of the chassis mountable base 3. Depending on the particular application, a different number or type of these fingers 4 may be mounted within the receptacles 5 to provide retention support for the adjacent expansion cards. Accordingly, the modularity or exchangeability of these spring-loaded fingers 4 is further illustrated with reference to FIGS. 3 and 4. As illustrated, the chassis mountable base 3 comprises a housing portion 39, a cantileverable portion 40, and a structural frame 41 having vents 42. The housing portion 39 of the chassis mountable base 3 comprises the receptacles 5 for selectively and removably receiving the desired spring-loaded fingers 4. In each of these receptacles 5, a variety of tool-free mounting mechanisms are provided to facilitate a quick and easy attachment, detachment, and exchange of the desired spring-loaded fingers 4.

Figure 3:
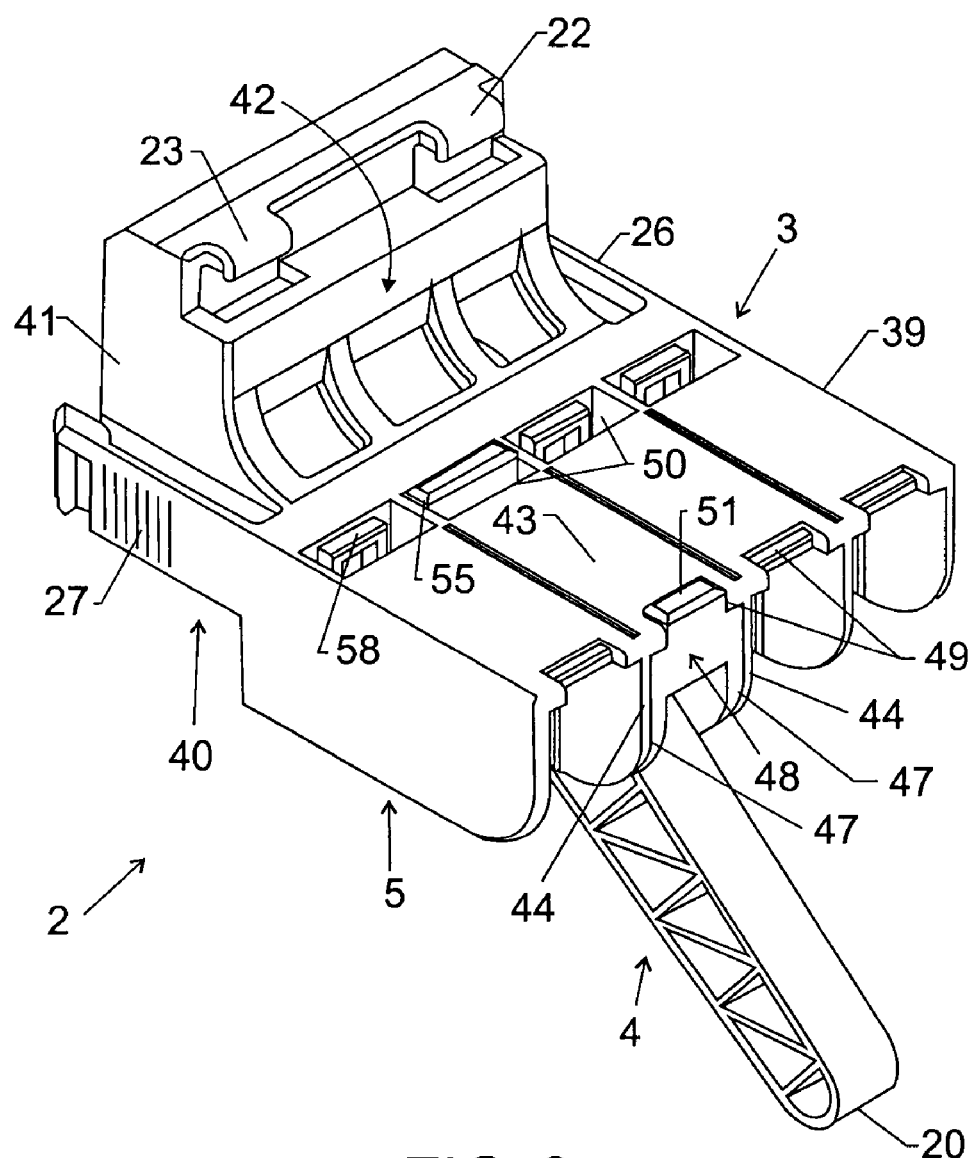
FIG. 3 is a front perspective view of the adjustable card support illustrating tool-free mounting mechanisms for a spring-loaded finger in accordance with certain embodiments of the present invention.

More specifically, in the illustrated embodiments of FIGS. 3 and 4, the receptacles 5 each comprise an upper member 43, two side members 44, and a rear member 45. The illustrated side members 44 are generally smooth with raised support portions 46. However, these side members 44 may employ other suitable texture and support features. The illustrated side members 44 provide lateral support to the side walls 47 of a housing 48 of the spring-loaded finger 4. The upper member 43 comprises a front catch lip or receptacle 49 and a rear catch or opening 50. For tool-free mounting with the front catch lip or receptacle 49 and the rear catch or opening 50, the spring-loaded finger 4 comprises a front catch or latching hook 51, a rear catch or latching hook 55, and spring latching structure 52 (see FIGS. 5 and 6).

Referring generally to FIGS. 3–6, for removable mounting to the adjustable card support 2, the illustrated spring-loaded finger 4 may be inserted into the receptacle 5 such that the rear catch 55 and the spring latching structure 52 engage the rear catch or opening 50, and the front catch or latching hook 51 engages the front catch lip or receptacle 49. During insertion of the spring-loaded finger 4 into the receptacle 5, the spring latch 52 deforms resiliently to facilitate passage of the spring latch 52 below the upper member 43. As a rear wall 53 of the spring-loaded finger 4 approaches and/or abuts the rear member 45 of the desired receptacle 5, a spring latch lip 54 of the spring latch 52 reaches the rear catch or opening 50. At this point, the spring latch 52 returns to its original state to position the spring latch lip 54 against a side of the rear opening 50, thereby releasably locking the spring-loaded finger 4 within the receptacle 5. Further, the rear catch 55 projecting from the rear wall 53 and a top wall 57 of the finger housing 48 extends over a rear shelf 58 projecting from the rear member 45 in the receptacle 5. This shelf engagement between the rear catch 55 and the rear shelf 58 cooperates with the spring latch 52 to maintain secure retention of the spring latch lip 54 within the rear opening 50. In addition, the shelf engagement cooperates with the front catch or latching hook 51 to maintain secure retention of the latching hook 51 about the front catch lip or receptacle 49.

For removal of the spring-loaded finger 4 from the receptacle 5, the spring latch 52 is depressed to release the spring latch lip 54 from the rear opening 50. The spring-loaded finger 4 is then pulled from the receptacle 5, such that the rear catch 55 withdraws from the rear shelf 58 and the front catch or latching hook 51 withdraws from the front catch lip or receptacle 49. During removal, the spring latch 52 remains deformed or depressed, such that the spring latch lip 54 passes below the upper member 43. Upon complete removal, the spring latch 52 returns to its original undeformed state.

Figure 5:
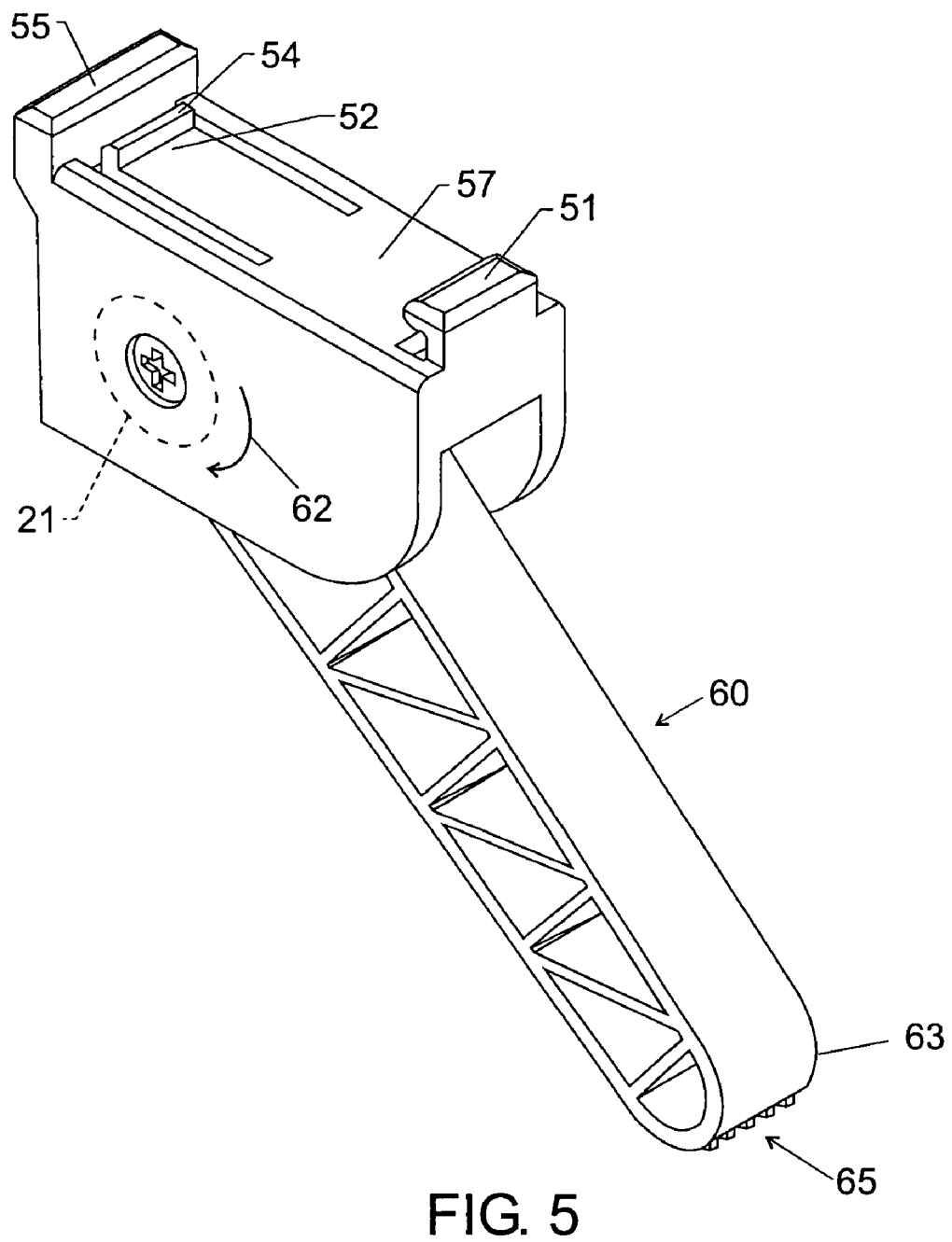
FIG. 5 is front perspective view of the spring-loaded finger in accordance with certain embodiments of the present invention.
Figure 6:
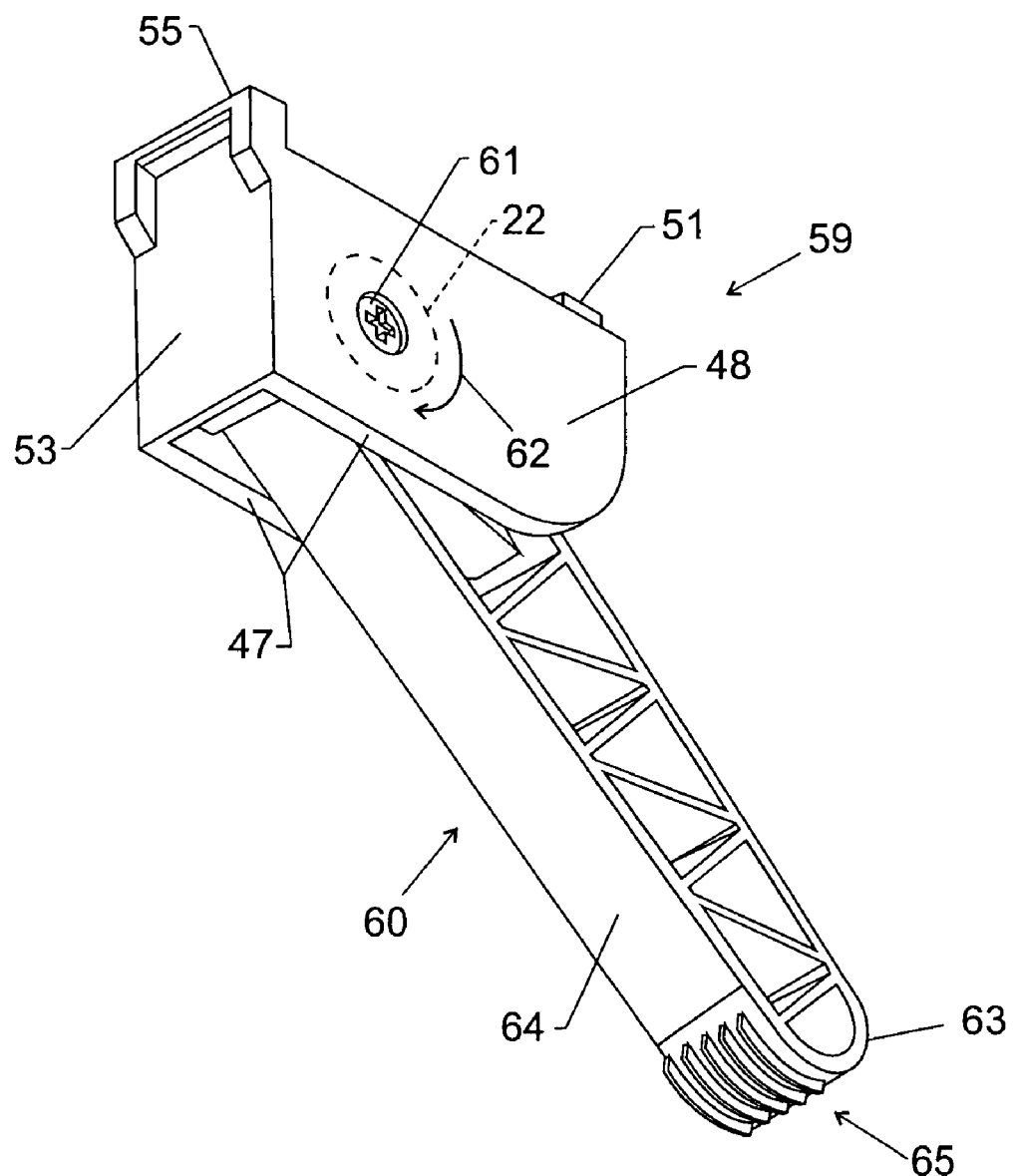
FIG. 6 is rear perspective view of the spring-loaded finger in accordance with certain embodiments of the present invention.

Turning now specifically to FIGS. 5 and 6, specific features of the spring-loaded finger 4 are described in further detail. As illustrated, the housing 48 of the spring-loaded finger 4 comprises a top wall 57, two side walls 47, and a rear wall 53. The top wall 57 comprises the front catch or latching hook 51 projecting upward and back toward the rear wall 53 from a front end 59, such that hook 51 is L-shaped. Additionally, the rear catch 55 of the spring-loaded finger 4 projects upward from the top wall 57 and outward from the rear wall 53. As discussed above, the front catch 51 and the rear catch 55 are configured for engagement with the front catch lip 49, the rear opening 50, and the rear member 45 of the receptacle 5.

The spring-loaded finger 4 of FIGS. 5 and 6 further comprises an elongated shaft 60 pivotally attached to the finger housing 48 with a pivot member 61. In this embodiment, the spring-loaded finger 4 also comprises a spring coil 21, which creates a rotational force 62 to bias the spring-loaded finger 4 toward the desired expansion card. As a result, the spring-loaded finger 4 maintains connection of the desired expansion card within its respective slot and thereby prevents dislodgement of the expansion card during vibrations and movement of the computer chassis 1.

At an outer end or free end 63 of the shaft 60, the spring-loaded finger 4 comprises a card engagement or contacting portion 65 to provide lateral retention of the desired expansion card. For example, the contacting portion 65 may comprise a substantially frictional material or textured surface, such as a rubberized surface and/or a texture of ribs, grooves, or multiple levels. Upon biased contact against the desired expansion card, the contacting portion 65 laterally retains the expansion card to inhibit undesirable vibrations and movement.

What is claimed is:

1. An expansion card support comprising:
   a mounting base comprising a chassis mounting latch configured to secure the mounting base removably to one side of a chassis; and
   a rotatable finger coupled to the mounting base via a latch, wherein the rotatable finger comprises a support end configured to engage and bias an expansion card after installation within a chassis without connection to a cover.

2. The expansion card support set forth in claim 1, wherein the mounting base comprises a receptacle for receiving the rotatable finger.

3. The expansion card support set forth in claim 1, wherein the mounting base comprises a plurality of finger mounting receptacles.

4. The expansion card support set forth in claim 3, wherein the plurality of finger mounting receptacles are arranged to correspond to expansion card slots in the chassis.

5. The expansion card support set forth in claim 1, wherein the rotatable finger comprises a spring separate from the support end and adapted to bias the support end against the expansion card.

6. The expansion card support set forth in claim 1, wherein the rotatable finger is rotatable to move the support end to a plurality of positions to accommodate different card dimensions.

7. The expansion card support set forth in claim 1, wherein the support end comprises a lateral retention mechanism.

8. The expansion card support set forth in claim 7, wherein the lateral retention mechanism comprises a frictional material.

9. The expansion card support set forth in claim 7, wherein the lateral retention mechanism comprises a multi-leveled surface.

10. A computer comprising:
    a chassis;
    a plurality of card slots; and
    a card support mechanism, comprising:
    a tool-free chassis mount coupled in a cantilevered configuration relative to a portion of the chassis adjacent the plurality of card slots; a plurality of tool-free arm mounts coupled to the tool-free chassis mount;
    wherein the tool-free chassis mount comprises a snap-fit mount coupled to a mating snap-fit mount disposed on the chassis; and
    at least one rotatable arm mounted to a desired one of the plurality of tool-free arm mounts, wherein the rotatable arm comprises a card engagement end positioned over a desired one of the plurality of card slots.

11. The computer set forth in claim 10, comprising an electronics card disposed in the card slot, wherein the card engagement end is biased against the electronics card.

12. The computer set forth in claim 10, wherein the card support mechanism comprises at least one other rotatable arm mounted to another desired one of the plurality of tool-free arm mounts and having another card engagement end positionable over another desired one of the plurality of card slots.

13. The computer set forth in claim 10, wherein the card engagement end comprises a substantially frictional material.

14. The computer set forth in claim 13, wherein the substantially frictional material comprises a rubber pad.

15. The computer set forth in claim 10, wherein the card engagement end comprises at least one groove adapted to engage a peripheral edge of an electronics card mountable in the desired one of the plurality of card slots.

16. A card support for a computer, the card support comprising:
   means for rotatably biasing a card into a card slot;
   means for laterally supporting a peripheral portion of the card;
   means for cantilevering to a chassis the means for rotatably biasing; and means for tool-free chassis mounting both the means for rotatably biasing and the means for cantilevering to the chassis.

17. The card support set forth in claim 16, wherein the means for biasing comprise means for engaging an intermediate edge of the peripheral portion.

18. A system, comprising:
   a card support mechanism configurable for at least one electronics card, comprising:
      a chassis comprising a first tool-free mounting mechanism; and
      a mounting base comprising a second tool-free mounting mechanism coupled to the first tool-free mounting mechanism, wherein the mounting base spans less than the full distance between first and second opposite sides of the chassis; and
      an arm coupled to the mounting base, wherein the arm comprises a card retention end springably engageable against a peripheral portion of the at least one electronics card, the card retention end positioned above the card slot.

19. The system set forth in claim 18, wherein the arm is tool-lessly coupled to the mounting base.

20. The system set forth in claim 18, wherein the arm is rotatable to engage and secure the at least one electronics card to the card support mechanism.

21. The system set forth in claim 18, wherein the arm comprises an elongated configuration with one end rotatably coupled to the mounting base.

22. The system set forth in claim 18, wherein the chassis comprises a desktop computer.

23. The system set forth in claim 18, wherein the chassis comprises a server.

24. A system, comprising:
   a card support mechanism, comprising:
      a chassis mountable structure having a tool-free, cantilevered chassis mount; and
      a springy arm toollessly and rotatably coupled to the chassis mountable structure and engageable against an electronics card disposed in the chassis, wherein the springy arm comprises an engagement end having at least one groove adapted to engage an outer edge of the electronics card.

25. The system set forth in claim 24, wherein the card support mechanism is adapted to provide lateral support to the expansion card.

26. A system, comprising:
   a chassis comprising a first side and a second side adjacent the first side;
   a board mounted to the first side and having a card slot;
   an expansion card mounted to the card slot; and
   a card support arm rotatably coupled via a first latch to a mounting base that is cantilevered via a second latch to the second side, wherein the card support arm is biased against a portion of the expansion card opposite from the board.

27. The system set forth in claim 26, wherein the card support arm is disposed in one of a plurality of receptacles in the mounting base.

28. The system set forth in claim 27, wherein the plurality of receptacles each comprise a latching mechanism for a plurality of card support arms.

29. The system set forth in claim 26, wherein the card support arm comprises a spring biasing the card support arm toward the expansion card.

* * * * *